UNITED STATES PATENT OFFICE.

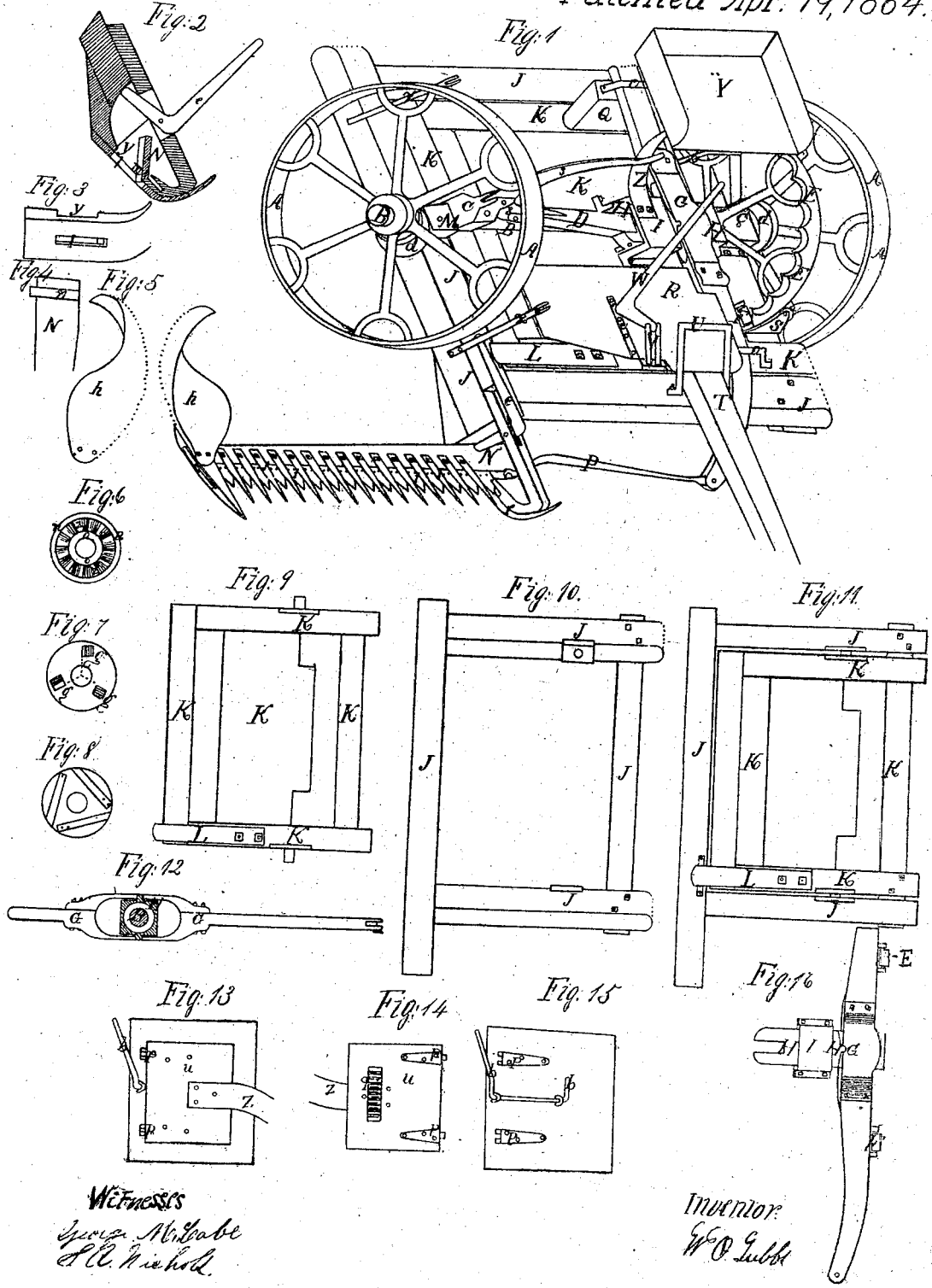

W. O. TUBBS, OF SPRING, PENNSYLVANIA.

IMPROVEMENT IN HARVESTERS.

Specification forming part of Letters Patent No. 42,420, dated April 19, 1864.

*To all whom it may concern:*

Be it known that I, W. O. TUBBS, of Spring, in the county of Crawford and State of Pennsylvania, have invented certain new and useful Improvements in a Mowing-Machine, of which the following is a full, clear, and exact description, reference being had to the accompanying drawings, which make part of this specification, and in which—

Figure 1 is a perspective view of a mowing-machine embracing my improvements. Fig. 2 shows a section of the shoe and finger-bar. Fig. 3 is an inverted view of the sustaining-shoe. Fig. 4 is an inverted view of the finger-bar. Fig. 5 is an inverted view of the track-clearer. Fig. 6 shows one half of clutch to ratchet. Fig. 7 shows remaining half of clutch to ratchet. Fig. 8 shows an inverted view of Fig. 7. Fig. 9 shows the frame upon which the gearing is mounted. Fig. 10 shows a self-adjusting frame to which finger-bar is attached by means of the sustaining-shoe. Fig. 11 shows a combination of the devices shown by Figs. 9 and 10. Fig. 12 shows an edge view of rocking beam, a section of sliding head, and axle. Fig. 13 shows an inverted view of driver's seat and fastenings. Fig. 14 shows a top view of board to upper end of seat-spring. Fig. 15 shows an inverted view of driver's seat. Fig. 16 shows an upper view of rocking beam, sliding head, and guide.

In the accompanying drawings, Fig. 1 shows my machine standing upon two drive-wheels, A, which are connected by the axle B, and which, when turned forward, cause the axle B to revolve with them by means of two ratchets, $d$, which allow a backward motion without rotating the axle. That part of $d$ which is shown in Fig. 6 is permanently attached to the drive-wheels A, of which it constitutes a part. The parts of Fig. 6 shown at $n$ and $o$ are plain surfaces on a level with the extreme points of the clutch $z$. Fig. 7 shows the other half of the ratchet $d$, which is rigid in its fastenings to the axle B, and is one inch and a half thick, through which there are three square mortises, in which the slides $g$ are fitted so as to work smoothly, forming the other half of the clutch to the ratchet. Figs. 6 and 7 are fitted so as to work smoothly together, the slides $g$ being held against Fig. 6 at $z$ by means of springs, as shown in Fig. 8, thus forming a shoulder-ratchet. Thus the forward motion of the drive-wheels A is communicated to the axle B, upon which is fastened the cam-wheel E, armed with twenty-five cams. The cam shown at E, driven forward, acts upon the roller F, causing the rocking beam G to recede, driving a corresponding roller on the upper end of the rocking beam, as shown in Fig. 16, between two cams on the opposite side of the cam-wheel E, which is in like manner acted upon, causing a vibratory motion of the rocking beam G, showing that each cam on the cam-wheel produces a stroke at each of the rollers F, causing fifty strokes of the rocking beam at each revolution of the cam-wheel E, which is communicated to the cutter $i$ by means of the pitman P. The rocking beam is pivoted to a sliding head, H, as shown in Fig. 12, which shows a section of the sliding head and axle B. Fig. 16 shows a top view of the rocking beam G and rollers F, with sliding head H and guide I, which is fastened to the frame K, under which H passes, and is held in proper position and is pivoted to the pitman D, the other end of which is connected in like manner to the bent lever $s$, which is armed with a long finger reaching out upon the pitman, the point of which is shown at D, allowing it to drop but a little below a horizontal. The lever $s$ is pivoted to the upper part of the bearing-box C, turning an acute angle at that point, passes up near the corner of the driver's seat V, so that he may readily move it when desired. If he moves the levers from him, he draws back the sliding head H, to which is attached the rocking beam G, relieving the rollers F from contact with the cam-wheel E, throwing the machine out of gear. A reverse action on the lever $s$ puts the machine in gear. The pitman D, falling a little below a level at $s$, remains a firm brace, keeping the rocking beam G in proper position.

V is the driver's seat, underneath of which is the spring Z, resting upon the guide I. Fastened upon the upper end of the spring Z is a square board, $u$, hinged to the front edge of the seat V, as shown in Fig. 13. Fig. 14 is a top view of the square board $u$.

$q$ represents notches, in which the back end of the bent lever $b$, as shown in Fig. 15, catches. If Fig. 15 be brought forward and the straps $p$ hinged with those on Fig. 14, Fig. 15 then brought over upon Fig. 14, they will be in order for operation, the lever $b$ raising or lowering the seat as it is moved.

The bent lever W, working in the jaws V and upon the plate $c$, when drawn back, raises the machine from its inclination to a parallel with the tongue T. The tongue T is hinged to the frame K, and may be moved to the right or left, causing much or little side draft. It also works up and down freely in the guide U. The frame K, upon which the gearing is mounted, is swung under and hangs upon the axle B by means of the bearing-boxes C. It also has two pivots, as shown in Fig. 9 at K, which work in the plates in Fig. 10, (shown at J.) The frame J, passing around the frame K, works upon its pivots, as shown in Fig. 11 at J K, which are directly beneath the rocking beam G. It is also supported by the stirrup M, which leaves it free to work up and down, except as slightly prevented by the spring L. The finger-bar N is secured to the lower extremity of the frame J, which readily adjusts it to the ground by means of the sustaining-shoe $f$. Fig. 4 shows an inverted view of the finger-bar, across which and near the end is secured the bar $m$, projecting a little in front and fitting closely in the mortise $l$, (shown in Fig. 3,) securing the bar N, as shown in Fig. 2. $m$ being pressed down into the mortise $l$, N will fit in the bed $y$, the lever $e$ being brought down rests upon the finger-bar N, as shown in Fig. 1, securing it in its heel-socket. The guard-teeth are so constructed that they pass under and over the bar N, both forks fastening with a single bolt, as shown at $j$. They also form the guides to the cutter $i$.

$h$ is a concave device for track-clearing, resembling the mold-board of a plow, and is made of sheet-iron, of which Fig. 5 is an inverted view.

The friction-roller $a$, working in the jaws S, is back of and supports the cam-wheel E, there being a corresponding one on the opposite side. The guides O, by which the rocking beam G is made to traverse in its proper line, is fastened firmly to the frame K—the front one directly, the back one by means of a block shown at Q.

The letters $x$ show a device for carrying finger-bar when detached from machine.

R is the driver's foot-rest, upon which the plate $c$ is fastened.

Having thus fully described the construction and operation of my improved mowing-machine, what I claim therein as new, and desire to secure by Letters Patent, is—

1. Fastening the heel end of the finger-bar in its socket in the sustaining-shoe by means of the lever $e$, combined with said shoe, substantially in the manner and for the purpose shown and described.

2. The arrangement of the bent lever $s$ and pitman D, in combination with the sliding head H and rocking beam G, for the purpose of throwing said beam in and out of gear with the cam-wheel E and firmly bracing the same when in gear, substantially as described.

3. The employment of the bent lever $b$, in combination with the driver's seat Y and its support, in the manner and for the purpose described.

W. O. TUBBS.

Witnesses:
A. M. BALDWIN,
CHAS. OLIVER.